(12) United States Patent
Argolini et al.

(10) Patent No.: US 9,567,891 B2
(45) Date of Patent: Feb. 14, 2017

(54) METHOD FOR CONTROLLING AN OXYGEN CONCENTRATION

(71) Applicant: GM GLOBAL TECHNOLOGY OPERATIONS LLC, Detroit, MI (US)

(72) Inventors: Roberto Argolini, Milan (IT); Giovanni Montinaro, San Pietro Vernotico (IT); Alberto Giordano, Robilante (Cuneo) (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 40 days.

(21) Appl. No.: 14/744,819

(22) Filed: Jun. 19, 2015

(65) Prior Publication Data

US 2015/0369104 A1 Dec. 24, 2015

(30) Foreign Application Priority Data

Jun. 21, 2014 (DE) .................... 20 2014 005 189 U

(51) Int. Cl.
*F01N 3/00* (2006.01)
*F01N 9/00* (2006.01)
(Continued)

(52) U.S. Cl.
CPC ............. *F01N 9/002* (2013.01); *F01N 3/0814* (2013.01); *F01N 3/0842* (2013.01); *F01N 9/00* (2013.01);
(Continued)

(58) Field of Classification Search
CPC .......... F01N 9/00; F01N 9/002; F01N 3/0814; F01N 3/0842; F01N 11/00; F01N 11/007; F01N 2560/025; F01N 2550/04; F01N 2900/0414; F01N 2900/1402; F02D 41/0275; F02D 41/028; F02D 41/1401; F02D 41/1441; F02D 41/1445; F02D 41/1454; F02D 2041/1432; Y02T 10/47
(Continued)

(56) References Cited

U.S. PATENT DOCUMENTS 6,024,069 A * 2/2000 Yoshino ................ F02B 17/005
123/295
6,634,170 B2 * 10/2003 Hiranuma ............. F02D 41/025
60/274
(Continued)

FOREIGN PATENT DOCUMENTS

DE 4112013 A1 10/1992
DE 10064665 A1 8/2002

OTHER PUBLICATIONS

German Patent Office, German Search Report for German Application No. 202014005189.5, dated Jan. 1, 2015.

*Primary Examiner* — Thomas Denion
*Assistant Examiner* — Diem Tran
(74) *Attorney, Agent, or Firm* — Lorenz & Kopf LLP

(57) ABSTRACT

A method is disclosed for controlling a concentration of oxygen that is measured by an oxygen sensor of an after-treatment system of an internal combustion engine when a regeneration of an after-treatment device is required. The method may be a computer-implement method. An oxygen sensor target value is lowered in a stepped phase as a function of an exhaust gas flow speed as the exhaust gas passes through the after-treatment system. The oxygen sensor target value is lowered evenly as a function of the exhaust gas flow speed and by a filter phase when a measured air/fuel ratio value is less than or equal to an AFR threshold value and until the oxygen sensor target value is equal to an oxygen sensor final target value. The oxygen (Continued)

concentration is controlled by applying the oxygen sensor target value.

15 Claims, 6 Drawing Sheets

(51) Int. Cl.
*F01N 11/00* (2006.01)
*F02D 41/02* (2006.01)
*F02D 41/14* (2006.01)
*F01N 3/08* (2006.01)

(52) U.S. Cl.
CPC .............. *F01N 11/00* (2013.01); *F01N 11/007* (2013.01); *F02D 41/0275* (2013.01); *F02D 41/1401* (2013.01); *F02D 41/1445* (2013.01); *F02D 41/1454* (2013.01); *F01N 2550/04* (2013.01); *F01N 2560/025* (2013.01); *F01N 2900/0414* (2013.01); *F01N 2900/1402* (2013.01); *F02D 41/028* (2013.01); *F02D 41/1441* (2013.01); *F02D 2041/1432* (2013.01); *Y02T 10/47* (2013.01)

(58) Field of Classification Search
USPC .......................................... 60/276, 285, 295
See application file for complete search history.

(56) References Cited

U.S. PATENT DOCUMENTS

| 7,159,391 | B2* | 1/2007 | Kogo .................... F01N 3/0253 60/274 |
| 7,389,683 | B2 | 6/2008 | Beer et al. |
| 7,587,892 | B2* | 9/2009 | Dye ........................ F01N 3/023 60/274 |
| 8,539,759 | B2* | 9/2013 | Ament .................... F01N 3/103 60/286 |
| 2014/0325960 | A1 | 11/2014 | Mahaveera et al. |

* cited by examiner

METHOD FOR CONTROLLING AN OXYGEN CONCENTRATION

CROSS-REFERENCE TO RELATED APPLICATION

This application claims priority to German Patent Application No. 202014005189.5, filed Jun. 21, 2014, which is incorporated herein by reference in its entirety.

TECHNICAL FIELD

The present disclosure relates to a method for controlling an oxygen concentration in the exhaust system of an internal combustion engine, and more particularly for adjusting the target value of the oxygen sensor that measures the oxygen concentration. The present disclosure further relates to a computer program that implements such a method.

BACKGROUND

It is known that the exhaust system of an internal combustion engine can be equipped with one or more after-treatment devices. Such an after-treatment processing device may be any kind of device that is configured so as to modify the composition of the exhaust gases. Some examples of after-treatment devices include NOx traps for lean operation (LNT) and particulate filters (DPF).

In particular, the NOx trap for lean operation as an inexpensive alternative to a system for selective catalytic reduction (SCR) is an after-treatment technology for reducing NOx emissions from an engine based on a NOx storage capacity during the Diesel engine standard working condition, that is to say in lean combustion phases. The NOx is then reduced during a rich combustion phase (DeNOx regeneration). The rich combustion phase is induced by a special control of the air and fuel supply.

Both LNT and DPF controllers use specific models in order to control these devices. The models need several inputs, the most important of which for correct functioning is the quantity of oxygen in the exhaust line.

Such an oxygen quantity signal is typically provided by an air/fuel ratio sensor (also called an oxygen sensor). Depending on the after-treatment configurations, it is possible to have a single oxygen sensor disposed upstream of the LNT or two oxygen sensors one upstream and another downstream of the LNT.

Exhaust gas oxygen sensors are used regularly in diesel applications to control fuel injection in order to remain in compliance with emission standards during the operating life of the vehicle and statutory requirements concerning on-board diagnosis (OBD II) regarding system faults in the fuel injection system. In particular, the oxygen signals are used to detect injector drift and balance the system setting and pilot injection deviation, thereby reducing combustion noise and ensuring good emissions performance. In some applications, oxygen measurement is also used to control and monitor the regeneration event of the NOx trap for lean operation.

In such a case, modulation of the post-injections is extremely critical during the rich combustion phases using a standard step target value adjustment for the oxygen sensor, especially if the sensor is functioning more slowly than the nominal condition due to possible deposits of hydrocarbons (HC) and soot on the probe. The transition from a lean to a rich combustion phase takes place in a sudden step change in the air/fuel ratio (AFR) target value, e.g., from 1.5 to 0.95.

The standard adjustment of the oxygen sensor is made on the basis of proportional-integral (PI) control, which acts on the post-injection quantity in conjunction with the AFR target value. The standard control causes the ratio to fall below the AFR (AFR values as low as 0.9 are achieved, for example), which in turn results in an increase in the hydrocarbon quantity, thus contributing to soiling of the sensor probe. This phenomenon slows the sensor performance down, and the situation is aggravated further by the ageing of the sensor.

Therefore, there is a need for a method to control the oxygen concentration, with which the drawbacks described above may be overcome. In one aspect, the method is embodied as a computer-implemented method.

SUMMARY

The present disclosure provides a method for controlling an oxygen concentration, particularly for modulating the oxygen sensor reference value in order to reduce the carbon peaks without impeding the reaction speed of the sensor. Other objects, features and characteristics will become apparent from the subsequent summary and detailed description, and the appended claims, taken in conjunction with the accompanying drawings and this background.

One embodiment of the disclosure provides a computer program that contains a computer code designed to execute a method for controlling an oxygen concentration, which is measured with an oxygen sensor of an after-treatment system in an internal combustion engine when regeneration of an after-treatment device is necessary. An oxygen sensor target value is lowered in a stepped phase as a function of an exhaust gas flow speed as the exhaust gas passes through the after-treatment system. The oxygen sensor target value is lowered evenly as a function of the exhaust gas flow speed and by a filter phase when a measured air/fuel ratio (AFR) value is less than or equal to an AFR threshold value and until the oxygen sensor target value is equal to an oxygen sensor final target value. The oxygen concentration is controlled by applying the oxygen sensor target value.

Similarly, a device for carrying out a method for controlling an oxygen concentration is also provided. The device includes a processor or engine controller configured with a computer program including computer code which configures the processor to execute a method for controlling an oxygen concentration, which is measured with an oxygen sensor of an after-treatment system in an internal combustion engine when regeneration of an after-treatment device is necessary, wherein an oxygen sensor target value is lowered in a stepped phase as a function of an exhaust gas speed when the exhaust gas flows through the after-treatment system evenly as a function of the exhaust gas flow speed and by a filter phase when a measured air/fuel ratio (AFR) value is less than or equal to an AFR threshold value and until the oxygen sensor target value is equal to an oxygen sensor final target value. The processor controls the oxygen concentration by applying the oxygen sensor target value.

Accordingly, a computer program including a computer code is also provided, wherein the computer program is designed to carry out a method for controlling an oxygen concentration that is measured by the oxygen sensor of an internal combustion engine after-treatment system. The method is executed when a regeneration of an after-treatment device is required. An oxygen sensor target value is lowered in a stepped phase as a function of an exhaust gas flow speed as the exhaust gas passes through the after-treatment system. The oxygen sensor target value is lowered evenly as a function of the exhaust gas flow speed and by a filter phase when a measured air/fuel ratio (AFR) value is less than or equal to an AFR threshold value and until the oxygen sensor target value is equal to an oxygen sensor final target value. The oxygen concentration is controlled by applying the oxygen sensor target value.

One advantage of this embodiment is controlling the oxygen concentration by the application of a modulated oxygen sensor target value during transitions from lean to rich combustion phases. With this modulation, it is possible to reduce the hydrocarbon peaks and thereby also limit the post-injection quantity very substantially while maintaining a simple PI for controlling the oxygen sensor in LNT applications. The fact that the modulation is a function of the exhaust gas flow speed further ensures that the reaction speed of the sensor is not impaired.

According to another embodiment of the method, the oxygen sensor target value in the stepped phase is equal to a preceding oxygen sensor target value, when the measured AFR value is greater than a previously measured AFR value. Similarly, the processor is configured to lower an oxygen sensor target value in a stepped phased to operate with the oxygen sensor target value that corresponds to a preceding oxygen sensor target value when the measured AFR value is greater than a previously measured AFR value. Correspondingly, the computer program is configured to set the oxygen sensor target value during the stepped phase equal to a preceding oxygen sensor target value when the measured AFR value is greater than a previously measured AFR value. One advantage of this embodiment is that, in abnormal situations, in which the AFR value increases, the advantageous effect of the small target value reduction would be lost.

According to a further embodiment of the method, the oxygen sensor target value during the stepped phase is calculated as the difference between a preceding oxygen sensor target value and a target value reduction when the measured AFR value is smaller than a previously measured AFR value. Accordingly, the processor is configured to lower an oxygen sensor target value in a stepped phase is configured to operate with the oxygen sensor target value calculated as the difference between the preceding oxygen sensor target value and a target value reduction when the measured AFR value is lower than a previously measured AFR value. Correspondingly, the computer program is configured to calculate the oxygen sensor target value during the stepped phase as the difference between a preceding oxygen sensor target value and a target value reduction when the measured AFR value is lower than a previously measured AFR value. One advantage of this embodiment consists in that the method also takes the effect of the exhaust gas flow speed into account so as not to impair the reaction speed of the sensor.

According to a further embodiment of the method, the target value reduction is calculated as a function of the exhaust gas flow speed. Accordingly, the processor is configured to lower an oxygen sensor target value in a stepped phase to operate with the target value reduction calculated as a function of the exhaust gas flow speed. Correspondingly, the computer program is configured to calculate the target value reduction as a function of the exhaust gas flow speed. One advantage of this embodiment also consists in that the method also takes the effect of the exhaust gas flow speed, so as not to impair the reaction speed of the sensor.

According to another embodiment of the method, a filter coefficient is calculated as a function of the exhaust gas flow speed during the filter phase. Correspondingly, the processor is configured to lower the oxygen sensor target value evenly in a filter phase so as to operate with a filter coefficient that has been calculated as a function of the exhaust gas flow speed. Correspondingly, the computer program is configured to calculate a filter coefficient as a function of the exhaust gas flow speed during the filter phase. For this purpose, the reaction speed of the sensor is assured in the filter phase as well, since the influence of the gas flow speed, and thus also the engine speed, is taken into account.

A further embodiment of the disclosure provides an automotive system that includes an internal combustion engine and an electronic control device, wherein the engine includes a post-treatment system with at least one oxygen sensor. The electronic control device is configured so as to run the computer program according to one of the preceding embodiments.

According to one of its aspects, the method may be carried out with the aid of a computer program that includes a program code for performing all of the steps of the method described in the preceding text, and in the form of a computer software product that includes the computer program.

The computer software product may be embedded in a control device for an internal combustion engine, which device includes an electronic control unit (ECU), a data carrier linked to the ECU, and the computer program stored on a data carrier, so that the control device defines the embodiments described in the same way as the method. Thus, when the control device runs the computer program, all of the steps in the method described in the preceding are also carried out.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
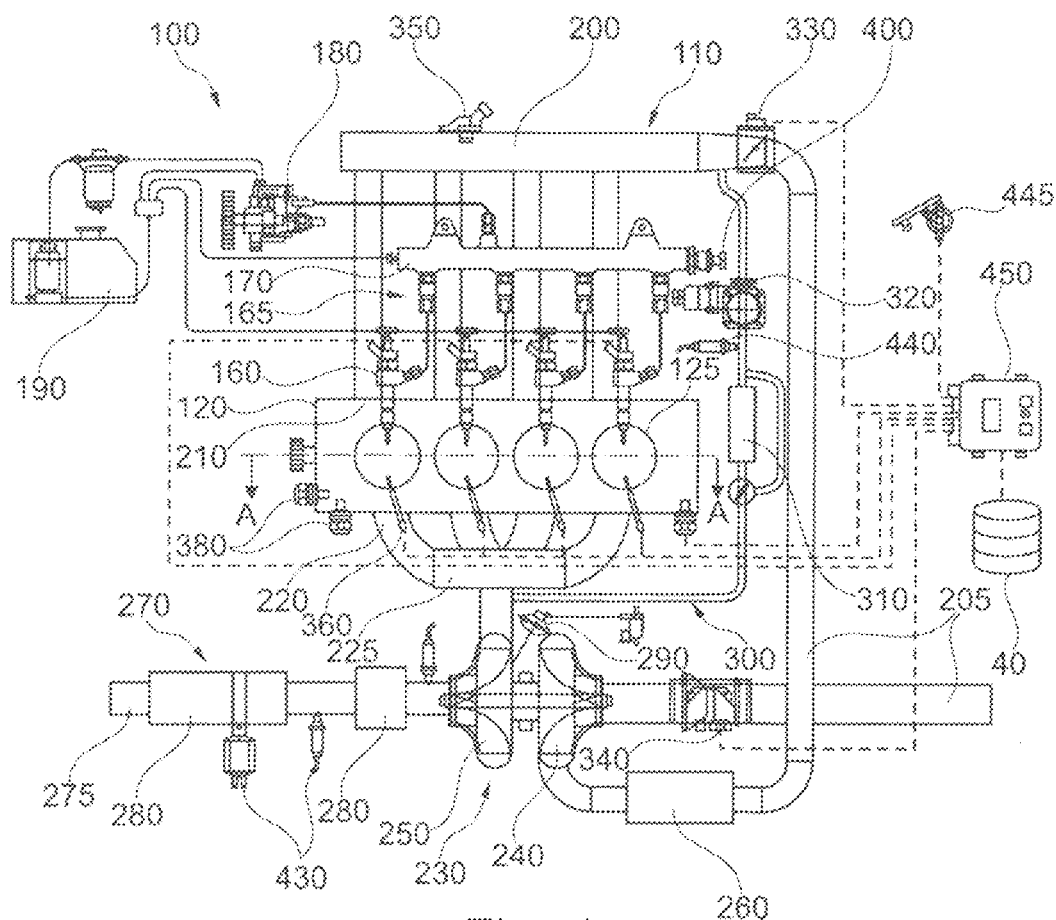
FIG. 1 represents a motor vehicle system.
Figure 2:
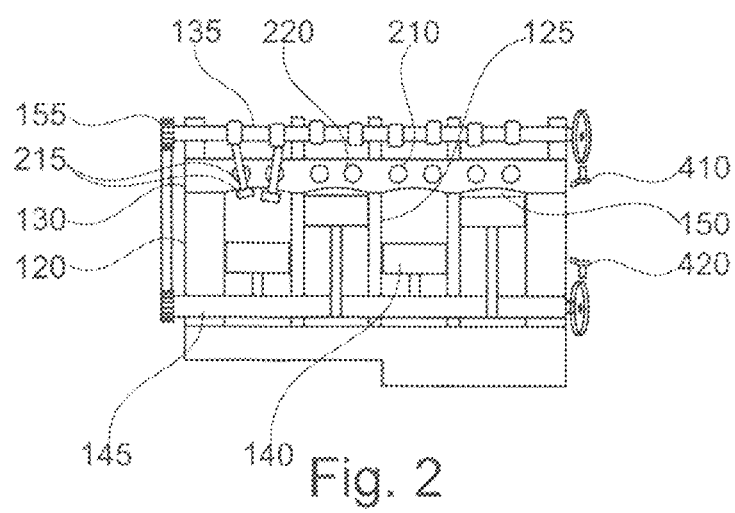
FIG. 2 is a cross sectional view through an internal combustion engine that forms part of the motor vehicle system of FIG. 1.

Some embodiments may include a motor vehicle system 100 as shown in FIGS. 1 and 2, which has an internal combustion engine (ICE) 110 with an engine block 120, which defines at least one cylinder 125 with a piston 140 coupled to a crankshaft 145. A cylinder head 130 cooperates with piston 140 to define a combustion chamber 150.

An air-fuel mixture (not shown) is introduced into combustion chamber 150 and ignited, creating hot, expanding gases that cause piston 140 to move back and forth. The fuel is supplied by at least one fuel injector 160, and the air is introduced via at least one inlet 210. The fuel is supplied to the fluid injector under high pressure by a fuel pipe 170 which is connected in fluid-feeding manner to a high pressure pump 180 that increases the pressure of a fuel coming from a fuel source 190.

Each of cylinders 125 has at least two valves 215, which are driven by a camshaft 135 which rotates synchronously with crankshaft 145. Valves 215 selectively allow air from inlet 210 into combustion chamber 150 and allow the exhaust gases to escape in alternating manner through outlet 220. In some embodiments, a camshaft shifting system 155 is used to selectively modify the synchronous sequence between camshaft 135 and crankshaft 145.

The air may be fed to air intakes 210 via an intake manifold 200. A line 205 passes ambient air to intake manifold 200. In other embodiments, a throttle valve 330 may be selected in order to adjust the airflow to the intake manifold 200. In further embodiments, a system for compressed air may be used, such as a turbocharger 230 with a compressor 240, which rotates together with a turbine (250). The rotation of compressor 240 increases the pressure and the temperature of the air in line 205 and intake manifold 200. An intercooler 260 disposed in line 205 may lower the air temperature. Turbine 250 rotates when exhaust gases coming from an outlet manifold 225 flow past it which manifold directs the exhaust gas from outlet 220 through a series of guide vanes before it is expanded by turbine 250. The exhaust gases exit turbine 250 and are forwarded to an exhaust system 270. This example shows a variable geometry turbine (VGT) with a VGT actuator 290, which is designed to move the guide vanes or blades so that the blades alter the flow of the exhaust gases through turbine 250. In other embodiments, turbocharger 230 may have a fixed geometry and/or a waste gate.

Exhaust system 270 may have an exhaust pipe 275 that includes one or more exhaust gas after-treatment devices 280. Exhaust gas after-treatment systems may be devices of any kind, with which the composition of the exhaust gases can be changed. Some examples of exhaust gas after-treatment systems are catalytic (two- and three-way) converters, oxidation catalysts, lean NOx traps, hydrocarbon adsorbers, selective catalytic reduction (SCR) systems and particulate filters. Other embodiments include an exhaust gas recirculation (EGR) system 300, which is connected to the outlet manifold 225 and the intake manifold 200. The EGR 300 may include an EGR cooler 310 to lower the temperature of the exhaust gases in the EGR 300. An EGR valve 320 regulates the flow of the exhaust gases in EGR system 300.

The motor vehicle system 100 may further include an electronic control module (ECM) 450, which is configured to transmit and receive signals to or from various devices that are connected to the ICE 100. The ECM 450 is able to receive input signals from various sensors coupled to the ICE 110, such as a mass flow and temperature sensor 340, a pressure and temperature sensor 350 for the manifold, a sensor 360 for the pressure in the combustion chamber, sensors 380 for the coolant fluid and oil temperature and/or the associated fill level, a pressure sensor 400 for the fuel, a camshaft position sensor 410, a crankshaft position sensor 420, sensors 430 for the pressure and temperature of the exhaust gases, an EGR temperature sensor 440 and a position sensor 445 for the accelerator pedal. ECU 450 may also transmit output signals to various control modules in order to control the operation of ICE 110, for example to fuel injectors 160, throttle 330, EGR valve 320, VGT actuator 290, and to camshaft shifting system 155. It should be noted that dashed lines are used to indicate different connections between the various sensors, devices and the ECM 450, and that others have been omitted for the sake of clarity.

Control module 450 may include a digital microprocessor unit (CPU) which is connected for data transmission purposes to a storage system and a bus system. The CPU is designed to process commands which are executed as a program stored in a storage system, to receive input signals from the data bus and send output signals to the data bus. The storage system may be equipped with various storage media, such as optical, magnetic, solid state or other non-volatile media. The program may be structured in such manner that it embodies and is able to execute the methods described here, so that the CPU is able to execute the steps of such methods and so control ICE 110.

The program stored in the storage medium is directed to the control module from the outside either via a cable connection or wirelessly. It appears regularly on a computer software product outside of motor vehicle system 100, and is also referred to as a computer- or machine readable medium, and is also to be understood as a computer software code on a carrier. The carrier may be of a volatile or transitory type or of a non-volatile or non-transitory type. Consequently, it is possible to describe the computer software product as being of the volatile or non-volatile type.

An example of a volatile computer software product is a signal, e.g., an electromagnetic signal such as an optical signal, which serves as a carrier for the computer software code. The signal may be rendered capable of carrying the computer software code by modulating the signal with a conventional modulation process such as QPSK for digital data, so that binary data representing the computer software code is imposed on the volatile electromagnetic signal. Such signals are used, for example, when a computer software code is transmitted wirelessly via a Wi-Fi connection to a laptop.

In the case of a non-volatile or non-transitory computer software product, a computer software code is embodied in a storage medium fixed on a substrate. The storage medium is then the non-volatile carrier described above, so that the computer software code is stored permanently or temporarily in or on the storage medium. The storage medium may be of conventional type, as is known in the realm of computer technology, e.g., a flash memory, an Asic, a CD or the like.

The motor vehicle system may have a different type of processor instead of an engine control module 450 for providing the electronic logic, such as an embedded controller, an onboard computer, or any other type of processor that is able to be used in a motor vehicle.

Figure 3:
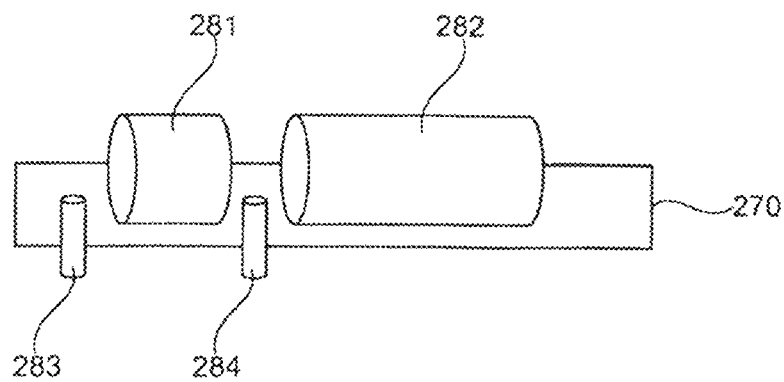
FIG. 3 is a diagram of an after-treatment architecture.

FIG. 3 illustrates an exemplary configuration of an after-treatment system for a diesel engine. It includes a lean NOx trap (LNT) 281 and a diesel particulate (DPF) 282. The controllers for both the LNT and the DPF use specific models to control these devices. The models require various inputs, of which one of the most important for proper functioning is the quantity of oxygen in the exhaust line. For example, the controller for DPF 282 uses a soot model based on thermokinetic reactions to determine the optimal DPF regeneration interval and the DPF regeneration duration by estimating active and passive regeneration reactions in the soot and substrate layer. The effectiveness of the DPF controller depends on the accuracy of the filter inlet emissions, such as $O_2$, HC, $NO_2$ and soot, which are obtained mainly by modelling gas concentrations at the engine outlet and after DOC conversion reactions.

Such oxygen quantity signals are generally provided by an air/fuel ratio sensor or oxygen sensor. Depending on the respective after-treatment configuration, one oxygen sensor 283 may be disposed upstream of the LNT, or two oxygen sensors, one upstream 283 and one downstream 284 of the LNT, as in the example of FIG. 3.

In the lean NOx trap applications, controlling the oxygen sensor target value poses a significant challenge for a variety of reasons, including: the system is extremely dynamic, particularly during the transition from the lean to the rich combustion phases; slow sensor responses; and the possibility that the system reaction time may change during the lifetime of the vehicle. Good behavior of the oxygen sensor signal with minimal use of post-injections during regeneration phases (rich combustion phases) is a critical point for optimizing the efficiency of the after-treatment system, by which the effects on fuel consumption are limited.

According to one embodiment of the present disclosure, the concept of limiting post-injection fuel quantity as far as possible—during the lifecycle of the vehicle as well—while preserving a simple proportional-integral (PI) control for controlling the oxygen sensor in LNB applications is based on intelligent monitoring of the target value during the transitions from lean to rich combustion phases.

Figure 4:
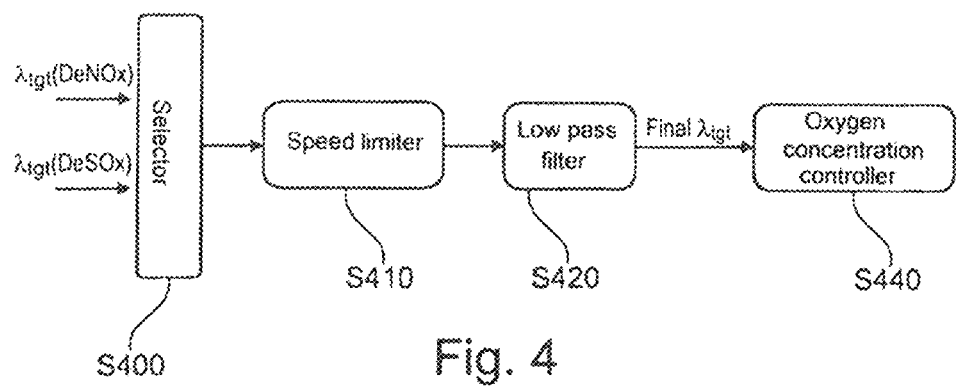
FIG. 4 is a flowchart of the computer program according to an embodiment of the present disclosure.

FIG. 4 is a high-level flowchart of a computer program according to an embodiment of the present disclosure. If the engine operating conditions according to the system status demand a regeneration of the LNT, a DeNOx regeneration or a desulphurization (DeSOx) regeneration is selected S400. Either of these would require a sudden change to the oxygen sensor target value $\lambda_{tgt}$(DeNOx) or $\lambda_{tgt}$(DeSOx). At the start of the transition, the oxygen sensor target value $\lambda_{tgt}$ is lowered in a controlled manner in single steps on the basis of the exhaust gas flow speed S410. Accordingly, the target value is not lowered abruptly, but slowly, which enables the measured AFR value to follow it without oscillations. In the event that the measured air/fuel ratio reacts more slowly, the increase of the integral part of the PI control is reduced, while the proportional operation is practically negligible. In other word, the stepped lowering of the target value follows the control response via the AFR.

As soon as the measured AFR has reached a certain limit value close to the value $\lambda_{tgt}$ (for example 1 if the target is 0.95), the target value is always filtered evenly on the basis of the exhaust gas flow speed until final target value Final $\lambda_{tgt}$ without any incidents of falling below the desired limit value S420. With these two steps, the oxygen concentration can be controlled S440 by using this behavior of the oxygen sensor target value ($\lambda_{tgt}$).

This strategy works well for low engine speeds, because it avoids falling below the AFR. On the other hand, the strategy would offer a slower reaction at high engine speeds, which would not be needed because the resulting higher gas speed does not cause a significant drop below the AFR. Therefore, in order to improve the efficiency of the system, it is important to optimize the duration of the target value transition between the lean and the rich combustion phases. For this reason, this adaptive target value control must be modulated according to the exhaust gas flow speed, which is also proportional to the engine speed. The greater the gas flow speed, the faster the sensor reacts.

Figure 5:
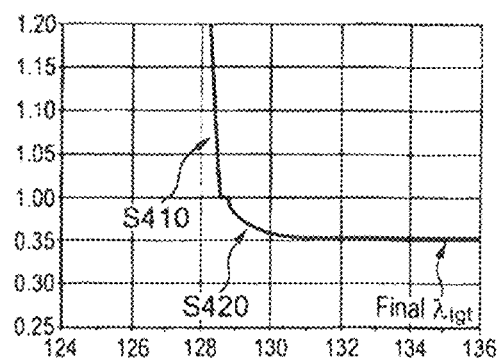
FIG. 5 is a graph representing the behavior of the oxygen sensor target value according to the embodiment of FIG. 4.

The behavior of the oxygen sensor target value according to the previous embodiment is represented in FIG. 5. FIG. 5 is a graph showing the target value plotted against time during a transition from a lean to a rich combustion phase. In the first section of such a curve, step S410, the stepped regulation of the target value is evident. A middle section of the curve then represents step S420, that is to say the evenly filtered regulation of the target value until it reaches its end value Final $\lambda_{tgt}$, which is shown in the last section of the curve of FIG. 5.

Figure 6:
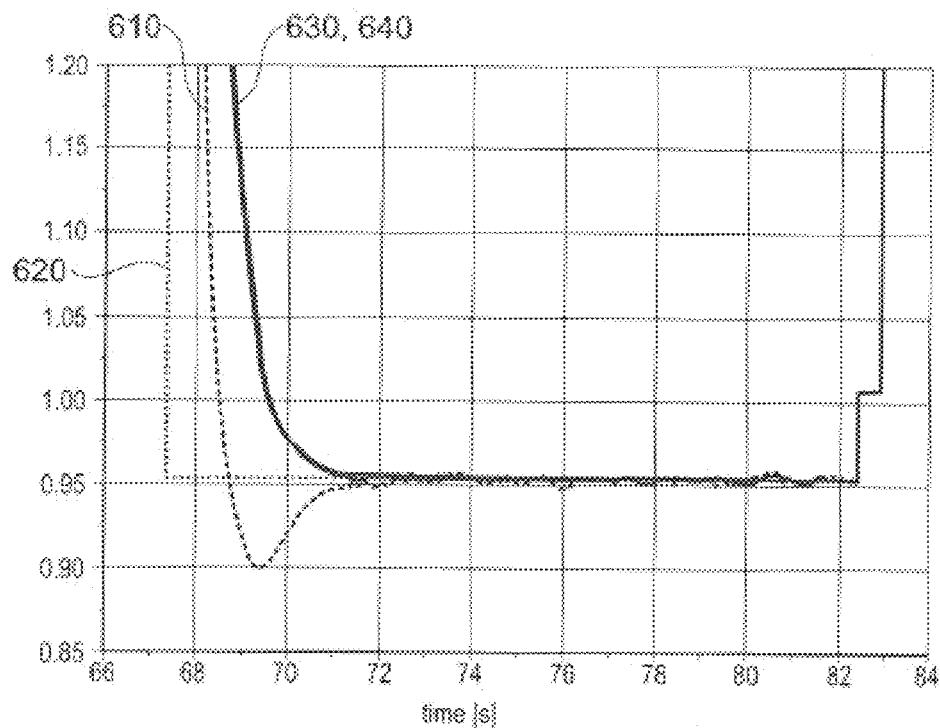
FIG. 6a) and b) are graphs representing the results of the oxygen concentration control according to the embodiment of FIG. 4.
Figure 6:
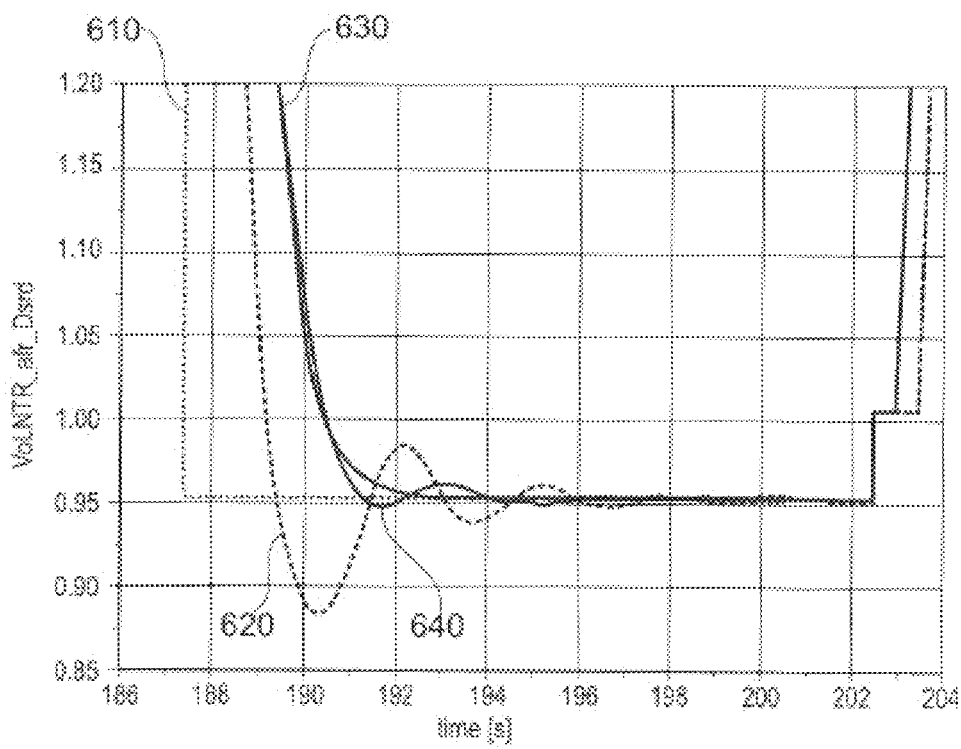

FIGS. 6a) and b) are graphs showing a comparison between a standard controller and a new controller of the oxygen sensor according to the described embodiment. The comparison is made on the basis of two different conditions, namely a nominal reaction sensor, FIG. 6a), and a slower sensor, FIG. 6b). The graph shows the AFR behavior over time during a transition from lean to rich combustion. In particular, the curves represent: the AFR target value with a standard oxygen sensor control 610; the measured AFR with the standard controller 620; and the AFR target value with the new oxygen sensor controller 630 and the measured AFR with the new control 640. As may be seen in the case of the nominal sensor (FIG. 6a), when the new strategy is used for the target value check, the value does not fall below the AFR (as is evident for the standard control), and the measured signal follows the target value behavior precisely. On the other hand, with a slower sensor (FIG. 6b) the remarkable oscillation of the measured AFR signal with the standard control 620 becomes practically negligible (curve 640) when the new control is used.

Figure 7:
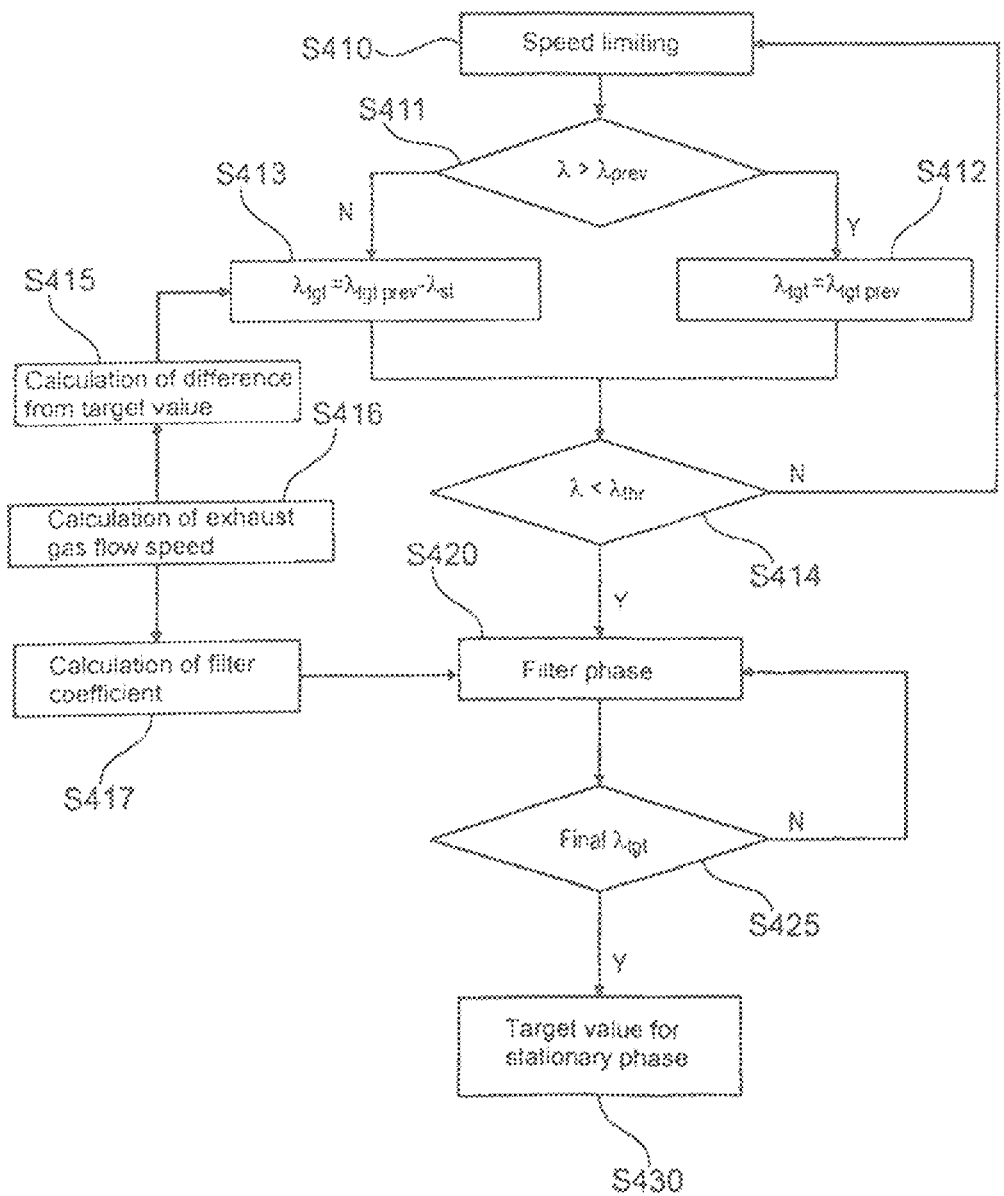
FIG. 7 is a flowchart of the computer program according to another embodiment of the present disclosure.

FIG. 7 shows a flowchart of a computer program according to a further embodiment of the present disclosure. At the beginning of the transition from the lean to the rich combustion phase, the oxygen sensor target value $\lambda_{tgt}$ is lowered incrementally and in controlled manner. In order to optimize such a target value reduction phase, a test S411 is run to verify whether the measured AFR value $\lambda$ is decreasing. If the AFR value is higher than a previous AFR Wert $\lambda_{prev}$, the AFR Target value $\lambda_{tgt}$ is kept constant S412 and equal to the previous AFR Target value $\lambda_{tgt\_prev}$. If abnormal situations arise (e.g., the driver decides to accelerate), the advantageous effect of the target value reduction would be lost as the AFR value increased. Therefore, it is (preferable to interrupt the target value reduction phase until the AFR value begins to fall again.

If the AFR value is falling, the target value reduction phase may continue with a determination of the distance reduction. First, the exhaust gas flow speed is calculated S416, the target value reduction $\lambda_{st}$ is calculated S415 on the basis of this flow rate. Then, the AFR Target value $\lambda_{tgt}$ is calculated, S413, as the difference between the previous AFR Target value $\lambda_{tgt\_prev}$ and the Target value reduction $\lambda_{st}$.

The speed limiting phase of the target value reduction continues until the measured AFR value $\lambda$ S414 falls below AFR threshold value $\lambda_{thr}$ (e.g., 1 as end target value equal to 0.95). In this case, a filter coefficient is calculated, S417—always on the basis of the exhaust gas flow speed. Then, the filter phase is carried out, S420, and the target value is filtered evenly.

The filter phase is ended when the target value $\lambda_{tgt}$ is equal to the end target value Final $\lambda_{tgt}$, S425, for example 0.95. Under these circumstances, the stationary phase is activated, S430, which means that the target value is not changed further until the DeNOx/DeSOx regeneration phase has been completed.

The present strategy with this new target value control has been tested under various conditions in driving cycles (for example the New European Driving Cycle, NEDC). Particularly with new oxygen sensors to evaluate the advantages of post-injection control during the transition from lean to rich and with slower (older) oxygen sensors to evaluate the improvements in terms of sturdiness with regard to worse conditions. The results have shown how promising this strategy is, as is already evident from FIGS. 6a) and b).

Figure 8A:
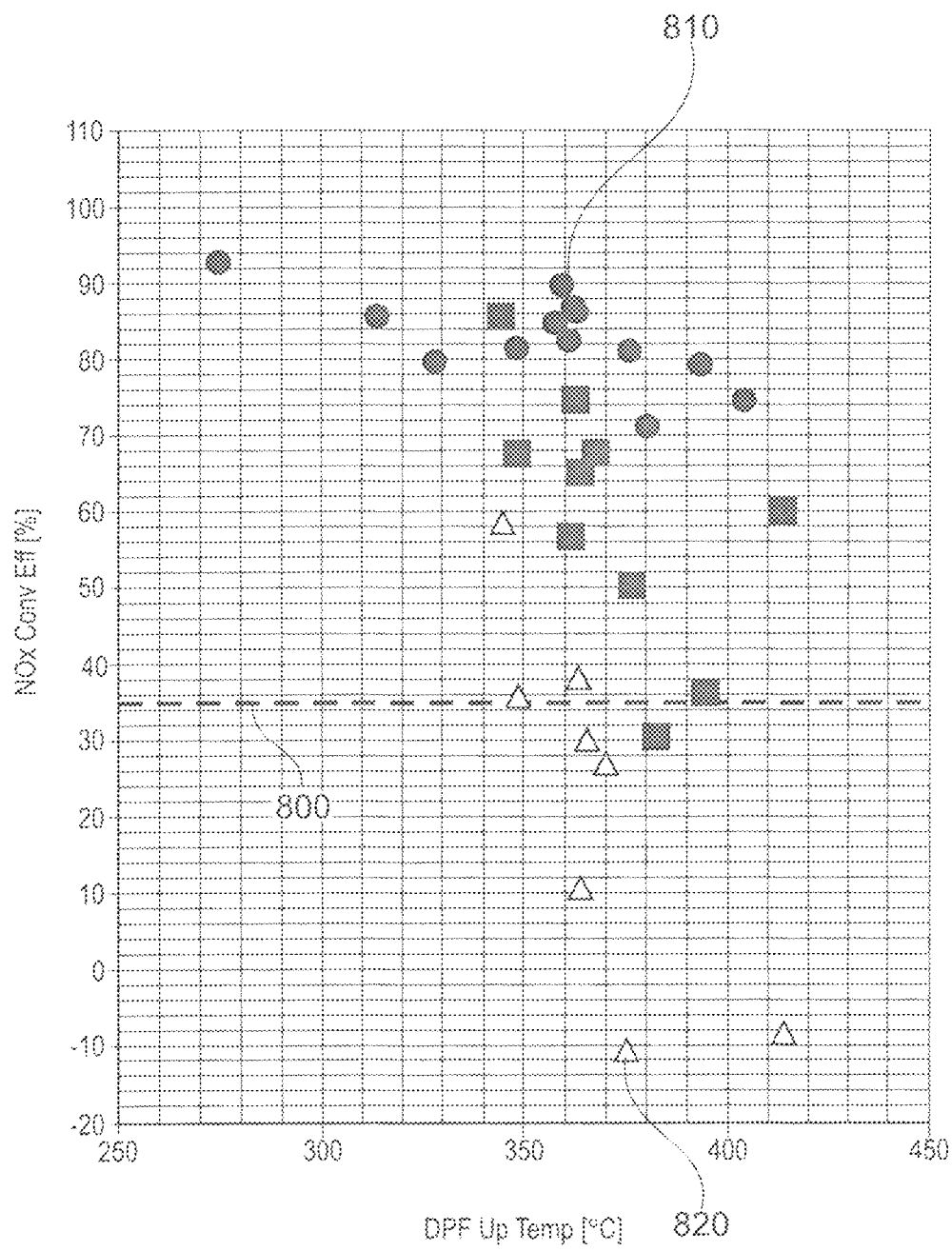
FIGS. 8a and 8b are graphs representing the influence of the present disclosure on a diagnostic result.
Figure 8B:
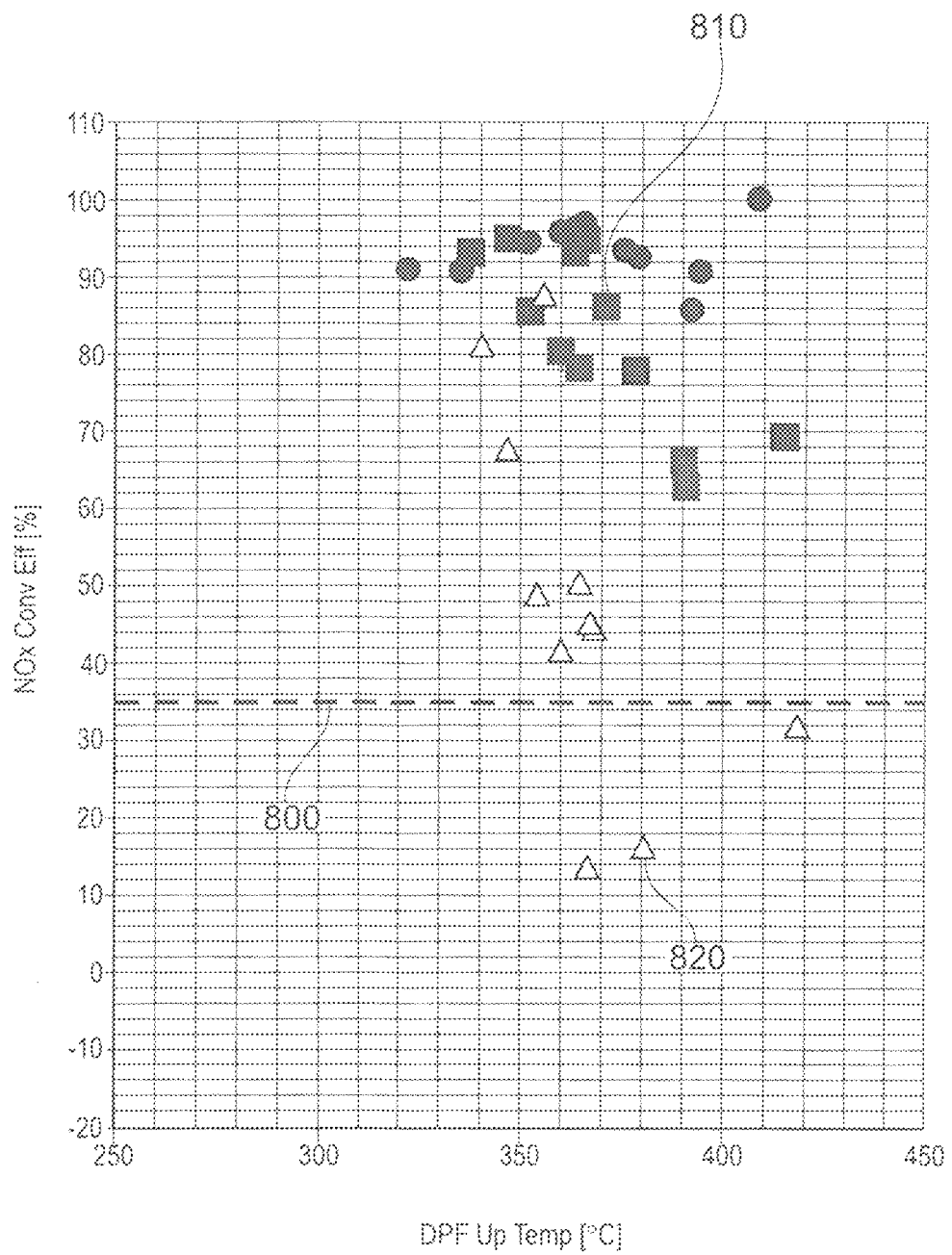

Finally, FIGS. 8a and 8b are graphs illustrating the effect of the present disclosure on the diagnosis of the conversion efficiency of the lean NOx trap. FIG. 8a relates to LNTs that used the standard control of the AFR target value, while FIG. 8b relates to LNTs that are based on the new oxygen sensor control. The graphs represent the NOx conversion efficiency as a function of the temperature of the exhaust gas upstream of the particulate filter. The various symbols 810, 820 relate to LNTs which are equipped with oxygen sensors characterized by varying degrees of clogging, that is to say they are variously aged. Dotted line 800 represents a diagnostic threshold value—symbols below and up to this line represent LNTs that are still functioning properly (good LNTs 810), while symbols below this threshold value line 800 are LNTs for which a diagnosis alarm has been issued (bad LNTs 820). Since the conversion efficiency is dependent on the accuracy of the oxygen sensor measurements, the new strategy also has beneficial effects for LNT diagnostics. As may be seen, the number of LNTs below the diagnostic threshold value (that is to say, with poor NOx conversion efficiency) under the same conditions is reduced when the new strategy is implemented. In fact, an oxygen sensor that was operated according to the old strategy can detect points of low conversion efficiency that are not attributable to a poorly functioning LNT, but rather to incorrect measurements. This means that with the new strategy the diagnostic alarm is only issued when an LNT really is in a critical state.

In summary, the new strategy is advantageous because it modulates the oxygen sensor target value to reduce hydrocarbon peaks without limiting reaction speed. This results in greater reliability of the oxygen sensor reaction during transitions from lean to rich combustion phases, better emissions monitoring and increased LNT efficiency.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method for controlling a concentration of oxygen which is measured by an oxygen sensor of an after-treatment system of an internal combustion engine when a regeneration of an after-treatment device is required, the method comprising:
   lowering an oxygen sensor target value ($\lambda_{tgt}$) in a stepped phase as a function of an exhaust gas flow speed as the exhaust gas passes through the after-treatment system;
   lowering the oxygen sensor target value ($\lambda_{tgt}$) evenly as a function of the exhaust gas flow speed and by a filter phase when a measured air/fuel ratio value ($\lambda$) is less than or equal to an AFR threshold value ($\lambda_{thr}$) and until the oxygen sensor target value ($\lambda_{tgt}$) is equal to an oxygen sensor final target value (Final $\lambda_{tgt}$); and
   controlling the oxygen concentration by applying the oxygen sensor target value ($\lambda_{tgt}$).

2. The method according to claim 1, further comprising equating the oxygen sensor target value ($\lambda_{tgt}$) to a previous oxygen sensor target value ($\lambda_{tgt\_prev}$) when the measured AFR value ($\lambda$) is greater than a previous measured AFR value ($\lambda_{prev}$) in the stepped phase.

3. The method according to claim 1, further comprising calculating the oxygen sensor target value ($\lambda_{tgt}$) as the difference between a previous oxygen sensor target value ($\lambda_{tgt\_prev}$) and a target value reduction ($\lambda_{st}$) when the measured AFR value ($\lambda$) is less than a previously measured AFR value ($\lambda_{prev}$) in the stepped phase.

4. The method according to claim 1, further comprising calculating the target value reduction ($\lambda_{st}$) as a function of the exhaust gas flow speed.

5. The method according to claim 1, further comprising calculating a filter coefficient as a function of the exhaust gas flow speed during the filter phase.

6. A motor vehicle system comprising an internal combustion engine having an after-treatment system including at least one oxygen sensor and an electronic control unit configured to execute a computer program for controlling a concentration of oxygen which is measured by the at least one oxygen sensor when a regeneration of an after-treatment device is required, including:
   lowering an oxygen sensor target value ($\lambda_{tgt}$) in a stepped phase as a function of an exhaust gas flow speed as the exhaust gas passes through the after-treatment system;
   lowering the oxygen sensor target value ($\lambda_{tgt}$) evenly as a function of the exhaust gas flow speed and by a filter phase when a measured air/fuel ratio value ($\lambda$) is less than or equal to an AFR threshold value ($\lambda_{thr}$) and until the oxygen sensor target value ($\lambda_{tgt}$) is equal to an oxygen sensor final target value (Final $\lambda_{tgt}$); and
   controlling the oxygen concentration by applying the oxygen sensor target value ($\lambda_{tgt}$).

7. The motor vehicle system according to claim 6, wherein the electronic control unit is configured to equate the oxygen sensor target value ($\lambda_{tgt}$) to a previous oxygen sensor target value ($\lambda_{tgt\_prev}$) when the measured AFR value ($\lambda$) is greater than a previous measured AFR value ($\lambda_{prev}$) in the stepped phase.

8. The motor vehicle system according to claim 6, wherein the electronic control unit is configured to calculate the oxygen sensor target value ($\lambda_{tgt}$) as the difference between a previous oxygen sensor target value ($\lambda_{tgt\_prev}$) and a target value reduction ($\lambda_{st}$) when the measured AFR value ($\lambda$) is less than a previously measured AFR value ($\lambda_{prev}$) in the stepped phase.

9. The motor vehicle system according to claim 6, wherein the electronic control unit is configured to calculate the target value reduction ($\lambda_{st}$) as a function of the exhaust gas flow speed.

10. The motor vehicle system according to claim 6, wherein the electronic control is configured to calculate a filter coefficient as a function of the exhaust gas flow speed during the filter phase.

11. A non-transitory computer-readable medium comprising a computer program having computer code configured to carry out a method for controlling a concentration of oxygen which is measured by an oxygen sensor of an after-treatment system of an internal combustion engine, wherein when a regeneration of an after-treatment device, including:

lower an oxygen sensor target value ($\lambda_{tgt}$) in a stepped phase as a function of an exhaust gas flow speed as the exhaust gas passes through the after-treatment system;

lower the oxygen sensor target value ($\lambda_{tgt}$) evenly as a function of the exhaust gas flow speed and by means of a filter phase when a measured air/fuel ratio (AFR) value ($\lambda$) is less than or equal to an AFR threshold value ($\lambda_{thr}$) and until the oxygen sensor target value ($\lambda_{tgt}$) is equal to an oxygen sensor final target value (Final $\lambda_{tgt}$); and control the oxygen concentration by applying the oxygen sensor target value ($\lambda_{tgt}$).

12. The non-transitory computer readable medium according to claim 7, wherein the computer program is further configured to equate the oxygen sensor target value ($\lambda_{tgt}$) to a previous oxygen sensor target value ($\lambda_{tgt\_prev}$) when the measured AFR value ($\lambda$) is greater than a previous measured AFR value ($\lambda_{prev}$) in the stepped phase.

13. The non-transitory computer readable medium according to claim 7, wherein the computer program is further configured to calculate the oxygen sensor target value ($\lambda_{tgt}$) as the difference between a previous oxygen sensor target value ($\lambda_{tgt\_prev}$) and a target value reduction ($\lambda_{st}$) when the measured AFR value ($\lambda$) is less than a previously measured AFR value ($\lambda_{prev}$) in the stepped phase.

14. The non-transitory computer readable medium according to claim 7, wherein the computer program is further configured to calculate the target value reduction ($\lambda_{st}$) as a function of the exhaust gas flow speed.

15. The non-transitory computer readable medium according to claim 7, wherein the computer program is further configured to calculate a filter coefficient as a function of the exhaust gas flow speed during the filter phase.

* * * * *